G. E. SELLERS.
TIRE CHAIN RETAINER.
APPLICATION FILED NOV. 11, 1920.
1,384,639.
Patented July 12, 1921.
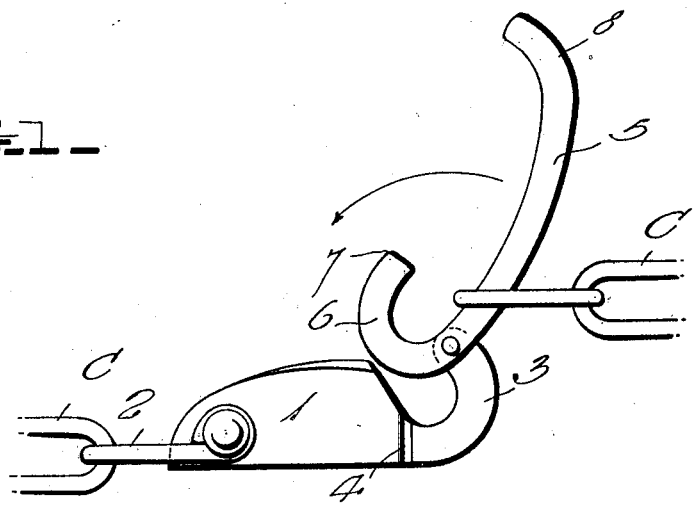
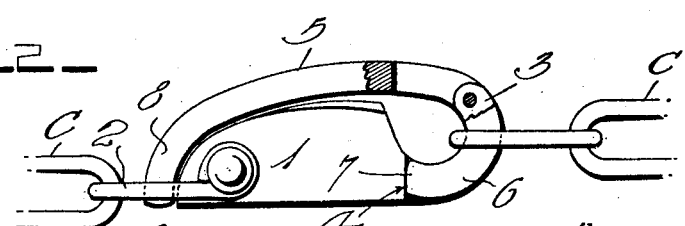
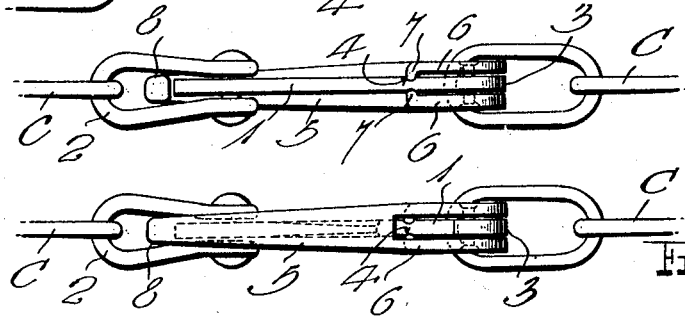
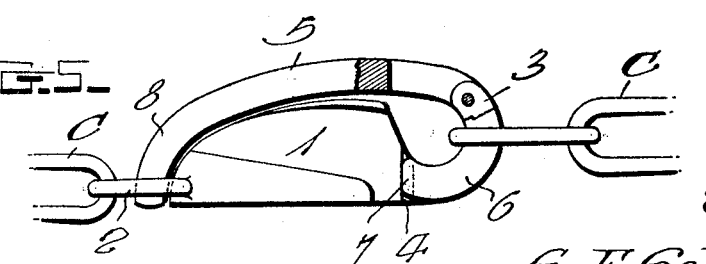
Witness
H. Woodard
Inventor
G. E. Sellers
By H. B. Wilson & Co.
Attorneys

UNITED STATES PATENT OFFICE.

GEORGE E. SELLERS, OF PALOUSE, WASHINGTON.

TIRE-CHAIN RETAINER.

1,384,639.  Specification of Letters Patent.  Patented July 12, 1921.

Application filed November 11, 1920. Serial No. 423,375.

*To all whom it may concern:*

Be it known that I, GEORGE E. SELLERS, a citizen of the United States, residing at Palouse, in the county of Whitman and State of Washington, have invented certain new and useful Improvements in Tire-Chain Retainers; and I do declare the following to be a full, clear, and exact description of the invention, such as will enable others skilled in the art to which it appertains to make and use the same.

This invention relates to an improved tire chain retainer such as is used in connection with anti-skid chains employed on the wheels of automobiles and the like, although it is not to be restricted to this particular use.

The principal object of the invention is to generally improve upon devices of this class by the provision of one of extreme simplicity and durability embodying a flat metal plate provided at one end with means for attachment to one end of the tire chain, and provided at its opposite end with a hook, at the inner end of which is opposed seats, there being a latch arm pivoted to the bill of this hook and the inner end of this latch arm being bifurcated and bent to form additional hooks disposed on opposite sides of the first hook, and the extremities of these hooks on the arm being provided with tongues receivable in said seats for retaining the latch-arm against accidental opening which oftentimes occurs with the types of retainers now on the market.

Another and important object of the invention is to provide a retainer embodying the above constructional features, the plate being wide at one end and relatively narrow at the other end and the upper edge thereof being longitudinally curved, and the latch-arm being curved to conform to this correspondingly curved edge of the plate, the extremity of this arm being more abruptly curved than the body portion so that when it is in locked position it will extend around the narrow end of the plate behind the attaching means for the chain, thus being guarded against accidental opening.

Other objects and advantages of the invention will be apparent during the course of the following description.

In the accompanying drawings forming a part of this specification and in which like numerals are employed to designate like parts throughout the same:

Figure 1 is a side elevational view of a retainer constructed in accordance with this invention, showing the manner in which it is associated with a tire chain.

Fig. 2 is a view similar to Fig. 1 with parts broken away and shown in sections, the latch-arm being shown in closed position.

Fig. 3 is a bottom plan view of the device.

Fig. 4 is a top plan view thereof.

Fig. 5 is a view like Fig. 2 disclosing a slightly modified form of the invention.

Referring to the drawings, the plate is indicated by the numeral 1 and as before intimated, it is composed of a flat piece of metal and is wide at the right hand end and reduced in width at the opposite end. The bottom edge of this plate is substantially straight while the upper edge is longitudinally curved in the manner shown. This plate will be secured to one end of the tire chain C through the medium of a pivoted U-shaped link 2. It may be well to mention at this point that in some instances, such as for instance as shown in Fig. 5, the attaching links 2 will be made an integral part of the plate. At its opposite end, the plate is provided with a hook 3, and the latter has formed at its inner end, on opposite sides of the plate, transverse grooves or seats 4 which serve an important purpose to be hereinafter set forth.

Pivoted intermediate its ends to the bill of the hook is a lever or latch-arm 5, which in its preferred form has its inner end, that is the short end, bifurcated to provide a pair of resilient arms which are then bent to form hooks which are disposed on opposite sides of the hook 3. The free ends of these hooked arms 6 are turned or bent laterally toward the plate as indicated at 7 to provide locking tongues adapted for reception in the grooves 4 for retaining the latch-arm in locked position. It is desirable to guard against accidental opening of the lever in another manner. To this end, I shape the lever in the manner illustrated so that it will conform to the curvature of the upper edge of said plate, the free end of this lever being more abruptly curved as indicated at 8 and this end extending around the pointed end of the plate to the lower edge of the latter. When in this position, the free end of the lever will be immediately in the rear of the link 2, and it will thus be seen that it will be guarded against accidental opening which might otherwise occur due to being struck by articles or obstacles lying in the path of travel of the machine. At this point I wish to direct attention to the fact that the device may be well termed a lever because when the right hand end or free end of the chain C is placed thereon in the manner illustrated in Fig. 1, and the lever moved to its closed or locking position, it will serve to draw the chain taut and take up slack.

The manner of using the retainer is thought to be obvious from the foregoing description and drawings and it is therefore deemed unnecessary to describe the use of the device.

From the foregoing description, it will be seen that I have devised an extremely effective and advantageous retainer for tire chains and the like. In support of the foregoing, it may be said that the locking lever is prevented from becoming accidentally opened due to being struck by obstacles in the road, because of its peculiar construction which positions the free end thereof at a point to guard it. The novel coacting means which serves to retain the lever in locked position, is advantageous and is automatic in operation. Furthermore, the construction which I employ permits the ends of the chain to be easily and readily connected together. These and other advantages and features of the device have, no doubt, become apparent from the foregoing description and drawing.

Since probably the best results may be obtained with the construction and arrangement shown and described, this construction and arrangement is taken as the preferred embodiment of the invention. However, I wish it to be understood that various minor changes in shape, size, and arrangement of parts may be resorted to without departing from the spirit of the invention or the scope of the annexed claims.

I claim:

1. A tire chain retainer comprising a flat plate provided at one end with means for connection to the chain or the like and at its opposite end with a hook, at the inner end of which are oppositely disposed seats, and a latch arm pivoted intermediate its ends to the bill of said hook, the inner end thereof being bifurcated and bent to form resilient hooks disposed on opposite sides of the plate, the free ends of said resilient hooks being formed with lateral tongues receivable in said seats.

2. The structure set forth in claim 1, said plate being relatively wide at one end and comparatively narrow at its opposite end, the lower edge thereof being straight and the upper edge being curved longitudinally from the wide end to the narrow end, and said latch arm being curved longitudinally to conform and fit snugly against the correspondingly curved upper edge of the plate, the free end of said arm being more abruptly curved and extending around the first named end of the plate to the lower edge of the latter, thereby being guarded against accidental opening when struck by obstacles.

In testimony whereof I have hereunto set my hand.

GEORGE E. SELLERS.